(No Model.)

H. ROTH.
CAR AXLE BOX.

No. 255,676. Patented Mar. 28, 1882.

WITNESSES:
Chas. Niag.
C. Sedgwick

INVENTOR:
H. Roth
BY Munn & Co.
ATTORNEYS.

UNITED STATES PATENT OFFICE.

HENRY ROTH, OF NEW YORK, N. Y., ASSIGNOR TO HIMSELF AND JOSEPH G. FOUNTAIN, OF NEW ORLEANS, LOUISIANA.

CAR-AXLE BOX.

SPECIFICATION forming part of Letters Patent No. 255,676, dated March 28, 1882.

Application filed October 22, 1881. (No model.)

*To all whom it may concern:*

Be it known that I, HENRY ROTH, of the city, county, and State of New York, have invented a certain new and useful Improvement in Car-Axle Brasses, of which the following is a full, clear, and exact description.

Reference is to be had to the accompanying drawings, forming a part of this specification, in which similar letters of reference indicate corresponding parts in all the figures.

Figure 1:
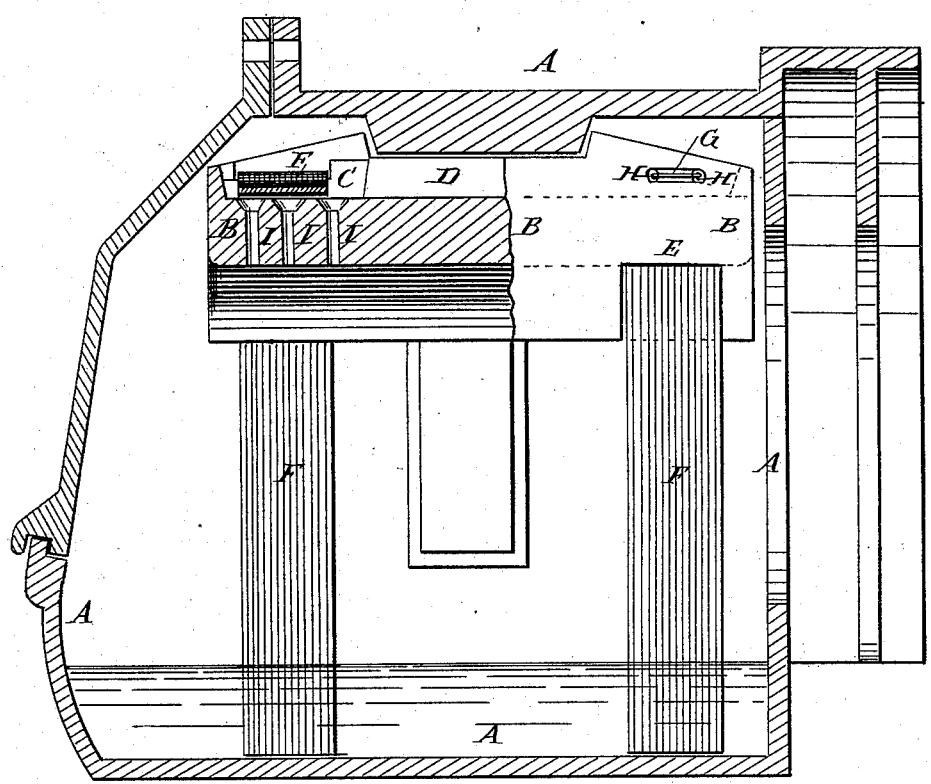
Figure 2:
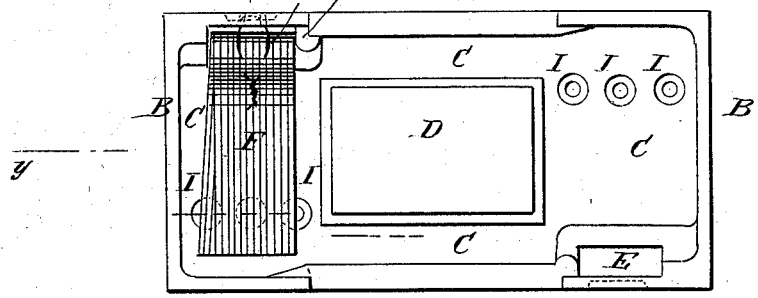
Figure 3:
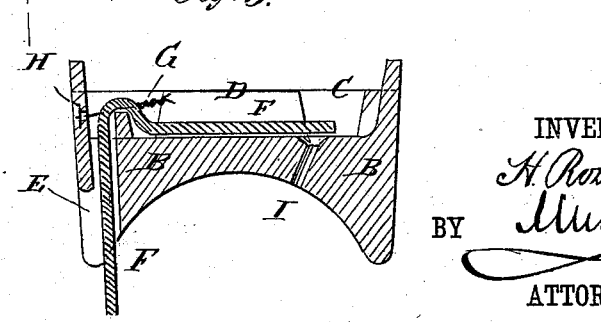

Figure 1 is a side elevation, partly in section, through the line $y\ y$, Fig. 2, of my improvement shown as placed in a car-journal box. Fig. 2 is a plan view of my improvement. Fig. 3 is a sectional elevation of the same, taken through the line $x\ x$, Fig. 2.

The object of this invention is to keep the journals of car-axles constantly lubricated.

A represents a journal-box. B is a brass or bearing, which is concaved upon its lower side in the ordinary manner to rest and fit upon the journal of a car-axle. Upon the upper side of the brass B is formed a recess, C, which extends all around a central projection, D, upon which the journal-box A rests. In the opposite end parts of the sides of the brass B are formed apertures E, through which are passed wicks F, or other suitable capillary conductors. The conductors F extend down to the bottom of the journal-box A, so as to absorb the oil or other lubricant therefrom and conduct it to the recess C of the brass B. The conductors F, are secured to the brass B by wires G, which pass through holes H in the sides of the brass B, and through the said conductors F, and which are secured in place by having their ends twisted together. The sides of the brass B are grooved between the holes H to receive the bends of the wires G. Through the end parts of the brass B are formed apertures I, through which the lubricant from the wicks passes to the axle or journal upon which the said brass rests.

With this construction the concave or friction surface of the brass B and the journal upon which the said brass rests will be kept lubricated so long as there is any lubricant in the journal-box A.

Having thus described my invention, I claim as new and desire to secure by Letters Patent—

The combination of the journal-box having the central projection, D, the brass having recess C, apertures E I, and holes H, and the wicks F, secured to brass by bent wires G, and having their ends twisted together as shown and described.

HENRY ROTH.

Witnesses:
  JAMES T. GRAHAM,
  C. SEDGWICK.